Figure 1:
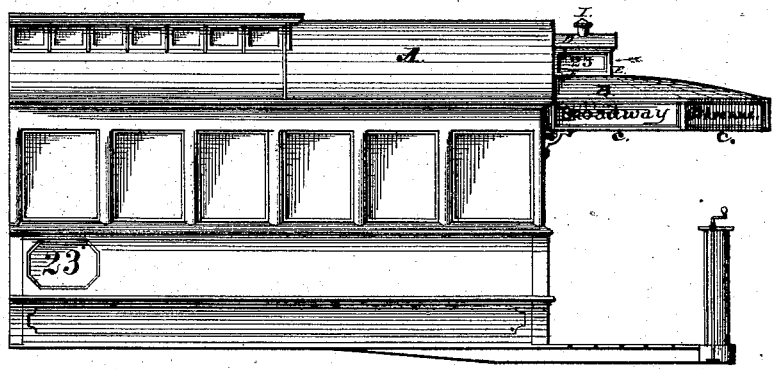

2 Sheets--Sheet 1.

A. A. YOUNG.
Street-Cars.

No. 154,819. Patented Sept. 8, 1874.

Attest:
Ira B. Merrill
Edwin A. Bell

Inventor:
Albert A. Young

2 Sheets--Sheet 2.

A. A. YOUNG.
Street-Cars.

No. 154,819. Patented Sept. 8, 1874.

Attest:
Ira B. Merrill
Edwin A. Bill

Inventor:
Albert A. Young

UNITED STATES PATENT OFFICE.

ALBERT A. YOUNG, OF BOSTON, MASSACHUSETTS, ASSIGNOR OF ONE-THIRD HIS RIGHT TO GEORGE W. ARMSTRONG, OF SAME PLACE.

IMPROVEMENT IN STREET-CARS.

Specification forming part of Letters Patent No. 154,819, dated September 8, 1874; application filed June 1, 1874.

*To all whom it may concern:*

Be it known that I, ALBERT A. YOUNG, of Boston, in the county of Suffolk and State of Massachusetts, have invented an Improvement in Street-Railway Cars, of which the following is a specification:

The object of the invention is to improve the lighting and the means of indicating the destination and route of street-railway cars by night.

The drawing, figures, and letters thereon are made parts of this specification.

Figure 3:
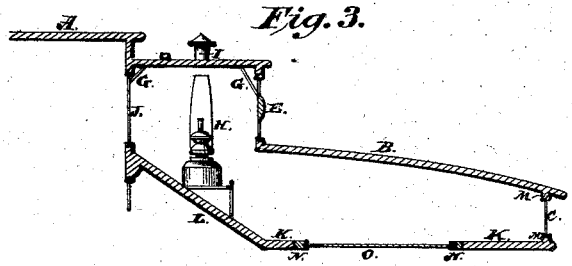
Figure 4:
Figure 5:
Figure 2:

Figure 1 is a side elevation of the car, and shows the improvements connected therewith. Fig. 2 is an end elevation, showing the front view of the visor or hood with signal-box attached, and the glass or other translucent material surrounding the hood or visor in a frame. Fig. 3 is a sectional view of the visor or hood, showing the position of the lamp and the signal-box with its bull's-eye, whereby the rays of light operate to light the car inside, the signal-box, the hood, and the platform of the car at the same time. Fig. 4 is an elevation of the door of the signal-box closed, as seen from the inside of the car. Fig. 5 is an elevation of the glass door of the signal-box open, showing the position of the lamp and the bull's-eye; also, showing the manner in which the lamp will operate to light the inside of the car, and at the same time the bull's-eye, the hood, and the platform of the car, as seen from the inside.

The letter A represents the car; B, the visor or hood; C C, the glass destinations around the hood; D, the signal-box; E, the bull's-eye; F F, the glass sides of the signal-box, showing the number of the car; G G, the reflectors for throwing the light back into the car, forward into the hood, and down through the glass to light the platform; H, the lamp; I, the jack on the signal-box for the escape of the smoke; J, the glass door of the signal-box to admit the lamp being placed therein or removed therefrom, as necessity may require; K K, the under-sheathing of the hood; L, the elevated section of the under-sheathing of the hood; M M, the frame for the glass destinations around the hood; N N, the frame for the glass for lighting the platform; O, the glass in said frame.

The object of the improvement in street-cars, further stated, is so to provide a car with suitable and proper illuminated destinations that the same will occupy a conspicuous place on the car, without being obstructed by signs of various business-firms of the city.

I am aware that transparent destinations on street-cars have been used, but in every instance these transparencies are applied to the roof or body of the car, and as it is the custom of our merchants to pay for the privilege of advertising their business on street-cars by the use of signs of various styles and sizes, these transparencies are of less value, as the signs aforesaid obstruct the view of the same. I moreover place the signal-box in an entirely new position, and light or illuminate the signal-box, the hood, and the platform at one and the same time, by the same light that illuminates the car inside. Another advantage gained is in the position of my signal-box, being outside the car. It being outside, and above the door of the car, the heat and smoke from the lamp, so usual in street-cars, are entirely obviated. Another advantage of the lamp being in this position is, it does away with the oil dripping down upon the passengers, thereby causing much trouble together with great expense and vexation to the owners of the cars. I give a clear transparent destination of the car, in combination with the visor or hood or double-roof extension of the car, and all being under or below the roof. A car with my improvement will run into any car-house with ease.

Having thus described the nature of the improvement, and that others may better understand the mode of construction and the application of the same, I will proceed to explain the improvement: Around the visor or hood B of the car I place a frame, M, on both sides and across the front or face, as seen in the drawings, Fig. 2. In this frame I place ground glass or its equivalent, as at C C in the drawings, Fig. 2, whereby the destination or route of the car is given by transparencies or illuminated designs. The under side of the hood is covered with sheathing or canvas K K, in the drawings, from the inner edge of the frame M, and extending to the body of the car in a parallel line, with the exception of the portion L directly in front of the door, which is raised or elevated from the level of the lower part to a position over the door. Through the sheathing K K I cut an opening, in which I insert the glass O or its equivalent, and through which the rays of the lamp above shine, lighting the platform and giving ample light to the driver, an entirely new feature in street-cars. The glass O may be put in a frame, as at N N in the drawings. On the glass C C may be shown any figure or other desired or suitable character or letter for giving the destination or route of the car. Above and in combination with the visor or hood I place a signal-box, D, as seen in the drawings Fig. 1, of any suitable size or form, in the front of which is placed a colored bull's-eye, E, or the common flash-glass for head-light or signal, the same being illuminated by the lamp H within the box D, as shown in Fig. 3 in the drawings. The sides of this box contain glass, as at F in the drawing, Fig. 1, which is also illuminated by the same lamp. The number of the car is given on these sides also by illumination. The back of this box D joins the body of the car A, and has a glass door, J, seen in Fig. 4 in the drawings, opening into the car from the inside, as shown in Fig. 5 in the drawings. From the position of the lamp H in the box D, the bull's-eye E is lighted forward, while the car is lighted in the rear, the light shining through the glass door J, and being strengthened by the aid of the reflector G, seen in Fig. 3 in the drawings. The opposite reflector G serves to throw the light down through the glass O, thereby lighting the platform of the car most complete, and giving the driver ample light to see to his horses, and at the same time throwing the light forward into the visor or hood B, illuminating the same and giving the destination of the car. From the position of the lamp H, it will be seen that all odor of smoke, &c., therefrom will be avoided, the lamp being entirely outside the body of the car. The jack I is of the ordinary pattern, simply, of sufficient draft to allow of a good light, and to allow the heat and smoke to escape. The door J (seen in Fig. 5 in the drawing) can be opened to insert the lamp, or remove the same, as necessity may require. I may use also reflecting surfaces inside the hood, if necessary. I place my signal-box in the most conspicuous place possible in or about the car, and also in an entirely new position; and as to the illuminated transparencies I place them on that part of the car where they have never been before known or used, namely, the hood; and the hood is composed of the usual visor extension with sides and an under surface, inclosing an irregular space, as shown in Fig. 3.

I claim—

1. In street-railway cars the hood B attached to or a part of the car, and consisting of the upper roof extension, the sheathing underneath forming a space between the two parts, and having its front sides C C, &c., translucent, with letters or characters inscribed thereon, in combination with a lamp, H, to illuminate said letters or characters, for the purpose of indicating the destination or route of the car, substantially as shown and described.

2. The combination of the reflector G, the lamp H, and the window O, set in a frame in the sheathing of the hood B, for the purpose of lighting the platform of the car, substantially as shown and described.

ALBERT A. YOUNG.

Witnesses:
FRED. C. BOTHAM,
EDWIN A. BELL.